United States Patent
Ming

(10) Patent No.: US 9,384,409 B1
(45) Date of Patent: Jul. 5, 2016

(54) WORD SEGMENTATION FOR DOCUMENT IMAGE USING RECURSIVE SEGMENTATION

(71) Applicant: KONICA MINOLTA LABORATORY U.S.A., INC., San Mateo, CA (US)

(72) Inventor: Wei Ming, Cupertino, CA (US)

(73) Assignee: KONICA MINOLTA LABORATORY U.S.A., INC., San Mateo, CA (US)

(*) Notice: Subject to any disclaimer, the term of this patent is extended or adjusted under 35 U.S.C. 154(b) by 0 days.

(21) Appl. No.: 14/609,331

(22) Filed: Jan. 29, 2015

(51) Int. Cl.
*G06K 9/34* (2006.01)
*G06K 9/62* (2006.01)
*G06K 9/52* (2006.01)

(52) U.S. Cl.
CPC ........ *G06K 9/344* (2013.01); *G06K 9/52* (2013.01); *G06K 9/6201* (2013.01)

(58) Field of Classification Search
USPC ............ 382/177, 173, 176, 224; 84/483.1; 434/156, 169, 185; 714/6.11, 755, 756
See application file for complete search history.

(56) References Cited

U.S. PATENT DOCUMENTS

| | | | |
|---|---|---|---|
| 5,467,360 A * | 11/1995 | Lokhoff | G11B 20/1809 714/6.11 |
| 6,393,395 B1 | 5/2002 | Guha et al. | |
| 7,596,272 B2 | 9/2009 | Sternby | |
| 8,965,127 B2 * | 2/2015 | Wu | G06K 9/348 382/173 |
| 2014/0270526 A1 | 9/2014 | Wu et al. | |

OTHER PUBLICATIONS

Arthur et al., "k-means++: The Advantage of Careful Seeding", 18th annual ACM-SIAM symposium on Discrete algorithms, 2007.
"Clustering", Opencv documentation, http://docs.opencv.org/modules/core/doc/clustering.html, 3 pages, printed from internet on Aug. 7, 2014.
Kim et al. "Word Segmentation of Printed Text Lines Based on Gap Clustering and Special Symbol Detection", 16th international conference on Pattern Recognition (2002).
Tsai et al., "Chinese Word Segmentation with Minimal Linguistic Knowledge: An Improved Conditional Random Fields Coupled with Character Clustering and Automatically Discovered Template Matching", Information Reuse and Integration, 2006 IEEE International Conference, Sep. 16-18, 2006, pp. 274-279.

* cited by examiner

*Primary Examiner* — Anh Do
(74) *Attorney, Agent, or Firm* — Chen Yoshimura LLP

(57) ABSTRACT

A word segmentation method uses a recursive technique to segment a text line image into word segments. Spacing segments of the line are obtained; an initial word segmentation is performed to classify the spacing segments based on their lengths into candidate character spacing segments and candidate word spacing segments. The initial segmentation result is evaluated to determine whether the candidate character spacing segments still have a bimodal or multi-modal distribution or a large spread in the distribution, or whether the line contains long words and too few words. If the conditions indicate that the initial segmentation is inadequate, another classification step is performed for the candidate character spacing segments to further classify them into new candidate character spacing segments and new candidate word spacing segments. The process is repeated until the word segmentation is deemed adequate based on the evaluation.

14 Claims, 3 Drawing Sheets

☒ I am currently enrolled in my company's 401(k) retirement plan with Paychex
Fig. 1A
This agreement is made on __2nd__ day of __Jan__ (month), __13__ (year), by and between
Fig. 1B
This agreement is made on    2nd    day of    Jan    (month),    13    (year), by and between
Fig. 1C
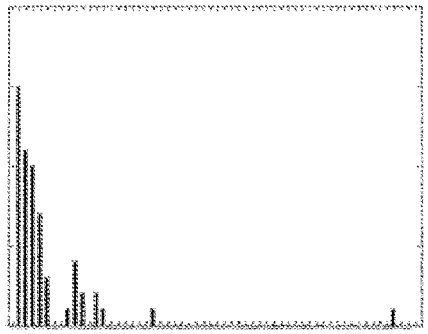
Fig. 1D
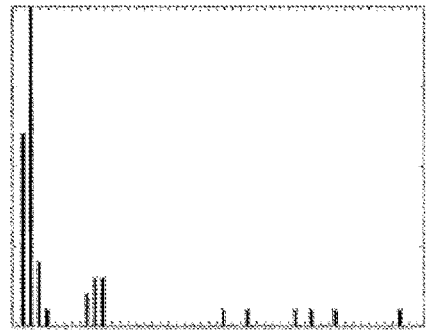
Fig. 1E
☒ I am currently enrolled in my company's 401(k) retirement plan with Paychex
Fig. 1F
This agreement is made on    2nd    day of    Jan    (month),    13    (year), by and between
Fig. 1G

WORD SEGMENTATION FOR DOCUMENT IMAGE USING RECURSIVE SEGMENTATION

BACKGROUND OF THE INVENTION

1. Field of the Invention

This invention relates to document image processing, and in particular, it relates to word segmentation, i.e. segmenting an image of a text line into sub-images corresponding to words.

2. Description of Related Art

A "document image" refers to a digital image representing a document which includes a substantial amount of text. For example, a document image may be generated by scanning a hard copy document, taking a photograph of a hard copy document, converting a text-based electronic document (e.g. a Word™ document) into an image format (e.g. PDF™), etc. "Document image processing" refers to various processing conducted for document images. One example of document image processing is optical character recognition (OCR), which aims to extract the textual content of the document. Another example of document image processing is document authentication, which aims to determine whether a target document image is the same as an original document image or whether it has been altered.

In some document image processing methods, a document image is segmented at various levels into blocks (e.g. paragraphs of text, photos, etc.), text lines segments, words segments, and/or symbol segments. These steps are sometimes referred to as paragraph (or block) segmentation, line segmentation, etc. and collectively referred to as document segmentation. Here, paragraph segment, line segment, etc. refer to sub-images that represent a paragraph, line, etc. of the document. In this disclosure, sometimes a paragraph segment, line segment, etc. is simply called a paragraph, line, etc., but it should be clear from the context of the disclosure that they refer to sub-images rather than the text of the paragraph, line, etc.

Word segmentation refers to segmenting lines into words. Many word segmentation methods are known. Some of these methods examine spacing segments (white spaces) in a text line to distinguish word spacing (space between neighboring words) and character spacing (space between neighboring characters within words). For example, Soo H. Kim, Chang B. Jeong, Hee K. Kwag, Ching Y. Suen. "Word segmentation of printed text lines based on gap clustering and special symbol detection", 16th international conference on Pattern Recognition (2002) (hereinafter "Kim et al. 2002"), describes a method which applies a hierarchical clustering method to spacing segments in a text line to distinguish word spacing and character spacing.

Commonly owned U.S. patent application publication 2014/0270526, published Sep. 18, 2014 (hereinafter "the '526 application"), describes a word segmentation method which applies clustering analysis to the spacing segments of a line. Taking advantage of the bimodal distribution of spacing length distribution of typical text lines, a k-means clustering algorithm is used, with the number of clusters pre-set to two, to classify the spacing segments into character spacings and word spacings. Moreover, k-means++ initialization is used to enhance the performance of cluster analysis.

SUMMARY

The present invention is directed to a word segmentation method and related apparatus that substantially obviates one or more of the problems due to limitations and disadvantages of the related art.

An object of the present invention is to provide a word segmentation method that can adequately handle text lines containing significantly variable word spacings.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a word segmentation method for segmenting a text line image into a plurality of word images, which includes: (a) obtaining a plurality of one-dimensional spacing segments from the text line image, the spacing segments corresponding to white spaces within the text line image, each of the spacing segments having a length; (b) classifying the plurality of spacing segments based on their lengths into a first group and a second group, each spacing segment belonging to the first group being shorter than each spacing segment belonging to the second group; (c) further classifying the spacing segments of the first group based on their lengths into a new first group and a new second group, each spacing segment belonging to the new first group being shorter than each spacing segment belonging to the new second group; and (d) segmenting the text line image into a plurality of word segments, each word segment being defined by two spacing segments not belonging to the new first group of spacing segments.

The method may further include, after step (b), determining whether the lengths of the spacing segments belonging to the first group have a bimodal or multi-modal distribution, wherein step (c) is performed if the lengths of the spacing segments belonging to the first group have a bimodal or multi-modal distribution.

The method may further include, after step (b), determining whether a spread of length distribution of the spacing segments belonging to the first group is greater than a predetermined threshold, the spread being defined as a length difference between a longest one and a most frequent one of the spacing segments belonging to the first group, wherein step (c) is performed if the spread is greater than the predetermined threshold.

The method may further include, based on the classification of step (b), calculating a number of characters in the text line, a number of words in the text line wherein each word is defined by two spacing segments belonging to the second group, a word length for each word in the text line, and an expected number of words for the text line which is the number of characters in the text line divided by a predetermined average word length, wherein step (c) is performed if the word lengths of a predetermined number of words in the text line exceed the predetermined average word length and the number of words in the text line is less than a predetermined fraction of the expected number of words for the text line.

In another aspect, the present invention provides a word segmentation method for segmenting a text line image into a plurality of word images, which includes: (a) obtaining a plurality of one-dimensional spacing segments from the text line image, the spacing segments corresponding to white spaces within the text line image, each of the spacing segments having a length; (b) classifying the plurality of spacing segments based on their lengths into a first group and a second group, each spacing segment belonging to the first group being shorter than each spacing segment belonging to the second group; (c) based on the first and second groups of spacing segments obtained in step (b), determining whether any of a plurality of predetermined conditions exists; (d) if any one of the predetermined conditions is determined to exist in step (c), further classifying the spacing segments of the first group based on their lengths into a new first group and a new second group, each spacing segment belonging to the new first group being shorter than each spacing segment belonging to the new second group; and (e) segmenting the text line image into a plurality of word segments, each word segment being defined by two spacing segments not belonging to the new first group of spacing segments.

The plurality of predetermined conditions in step (c) may include: (1) the lengths of the spacing segments belonging to the first group have a bimodal or multi-modal distribution, (2) a spread of length distribution of the spacing segments belonging to the first group is greater than a predetermined threshold, the spread being define as a length difference between a longest one and a most frequent one of the spacing segments belonging to the first group, and (3) word lengths of a predetermined number of words in the test line exceed a predetermined average word length and a number of words in the text line is less than a predetermined fraction of an expected number of words for the text line, wherein the words in the text line are defined by spacing segments belonging to the second group of.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

BRIEF DESCRIPTION OF THE DRAWINGS

FIGS. 1A-1C show examples of lines of text in a document image which have non-uniform word spacings.

FIGS. 1D and 1E are histograms of spacing distributions for the examples in FIGS. 1A and 1C, respectively.

FIGS. 1F and 1G illustrate the result of a conventional word segmentation method applied to the examples of FIGS. 1A and 1C, respectively.

DETAILED DESCRIPTION OF PREFERRED EMBODIMENTS

The clustering-based word segmentation method described in the '526 application works well when word spacings are larger than character spacings and when word spacings are substantially uniform in size. However, the latter condition—substantially uniform word spacings—is not always satisfied in actual documents. Word spacings may vary due to document layout design, different fonts or sizes used in a line, etc. Some document image processing procedure may also change word spacing. FIG. 1A shows a line of text in a document having non-uniform word spaces due to layout and mixed fonts. FIG. 1B shows a line of text in a document with substantially uniform word spacing, but the word spacing becomes non-uniform after removal of the underlines as shown in FIG. 1C. Histograms of the spacing distribution for the examples of FIGS. 1A and 1C are shown in FIGS. 1D and 1E, respectively. In each histogram, the horizontal axis represents the length of spacings in number of pixels (each division in the horizontal direction is 1 pixel in these examples) and the vertical axis represents the number of occurrence of spacings having a particular length (each division in the vertical direction is 5 in these examples). It can be seen from FIGS. 1D and 1E that in such cases, the word spacing distribution is no longer bimodal; rather, each distribution has multiple peaks.

In the example of FIG. 1A, when the spacings are classified into two groups based on length, the large spacing between the checkbox and the rest of the text (which corresponds to the far-right bar in the histogram of FIG. 1D) will be classified into one group (word spacing) and all other spacings will be classified into another group (character spacing), resulting in a word segmentation shown in FIG. 1F, where all the text other than the checkbox is deemed one word as indicated by the bounding boxes around the text. In the example of FIG. 1C, when the spacings are classified into two groups using a clustering method, the six longest spacings will be classified into one group (word spacing) and all other spacings will be classified into another group (character spacing), resulting in a word segmentation shown in FIG. 1G where each bounding box represents a segmented "word". The word segmentation results shown in FIGS. 1F and 1G are inadequate.

Embodiments of the present invention provide a word segmentation method which can adequately handle text lines with substantially variable word spacing such as those shown in the above examples. The method uses a recursive segmentation approach to classify spacing segments into multiple groups.

Figure 2:
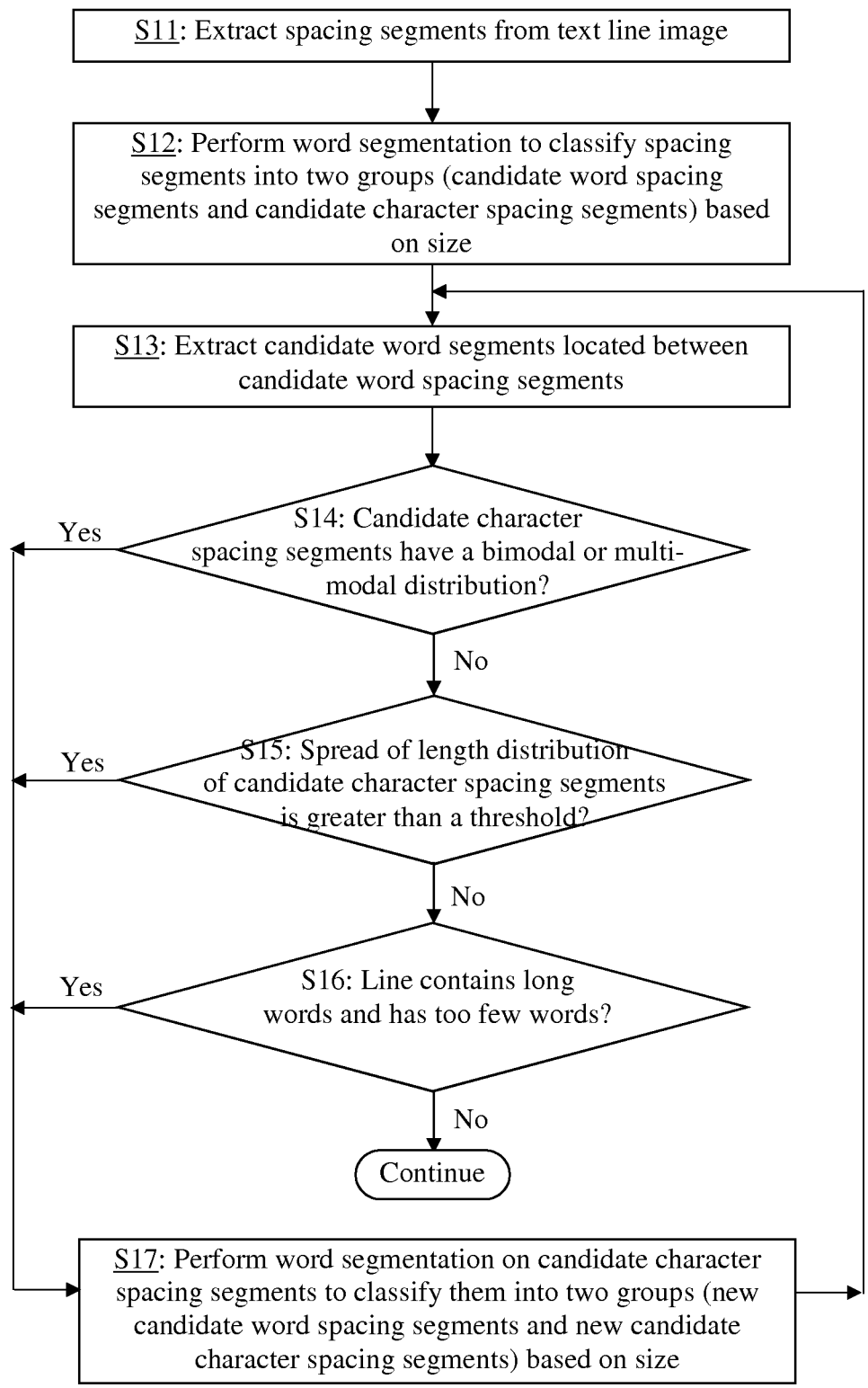
FIG. 2 schematically illustrates a recursive word segmentation method according to an embodiment of the present invention.

FIG. 2 schematically illustrates a word segmentation method according to an embodiment of the present invention. The input is a binary image representing a line of text. First, spacing segments of the text line are extracted from the line image (step S11). Each spacing segment, which correspond to a white space between text characters, is represented by a horizontal position and a length (e.g. in number of pixels). More specifically, a one-dimensional vertical projection profile of the line segment is generated from the input line image, where the X axis of the profile represents the horizontal pixel position and the Y axis represents the number of black pixels in the line bounding box at each horizontal pixel position. Optionally, the vertical projection profile is smoothed using a sliding window (e.g. a window of 3 pixels wide). Then, thresholding is applied to the vertical projection profile to generate a binary profile. Spacing segments, i.e., consecutive pixel positions where the value of the binary profile is 0, are extracted. The segments located between spacing segments are referred to as symbol segments. Other suitable methods may also be used to generate spacing segments from a text line.

Then, an initial word segmentation step is performed to classify the spacing segments into two groups based on their lengths, where each spacing segment in the first group is shorter than each spacing segment in the second group (step S12). The first group of shorter spacing segments is referred to as the candidate character spacing segments and the second group of longer spacing segments is referred to as the candidate word spacing segments. The initial word segmentation step may employ any suitable word segmentation method, including the clustering method described in Kim et al. 2002 or the '526 application, an adaptive thresholding method such as the Otsu method, etc. The segments of the text line image located between two neighboring candidate word spacing segments are extracted as candidate word segments (step S13). In the above two examples, the results of the initial word segmentation step can be seen in FIGS. 1F and 1G, where the bounding boxes represent the extracted "words."

Then, a number of conditions of the segmentation result are examined to determine whether the initial word segmentation result is adequate. If any of the following conditions exists, the initial word segmentation is deemed inadequate and a second (and further as necessary) round of word segmentation is performed.

The first condition (step S14) is that the group of candidate character spacing segments still have a bimodal or multi-modal length distribution. In one implementation, this determination is made by calculating a fitting curve for the contour of distribution histogram of the candidate character spacing segments and determining the number of peaks or valleys of the curve. One example of a type of suitable fitting curve is a well known technique called active contour model (also called snakes). If the number of distinct peaks in the curve is greater than or equal to 2 or the number of valleys is greater than or equal to 1, the distribution of the candidate character spacing segments is deemed bimodal or multi-modal. For example, in the exemplary histogram shown in FIG. 1E, the candidate character spacing segments would include all spacing segments except the six longest segments; their distribution would be determined in step S14 to be bimodal.

The second condition (step S15) is that the spread of the length distribution of the candidate character spacing segments, defined as the length difference between the longest candidate character spacing segments and the most frequent candidate character spacing segments (i.e. the highest peak in the distribution histogram), is greater than a predetermined threshold, such as 5 pixels. This is based on the assumption that the most frequent spacing segments will be true character spacing segments and their length will be a typical length of true character spacing segments, and that the longest true character spacing segment should not be longer than the typical character spacing segments by too much. For example, in the exemplary histogram shown in FIG. 1D, the candidate character spacing segments would include all segments except for the longest one; the length difference between the longest of them and the most frequent of them is greater than 5.

The third condition (step S16) is the presence of one or more (or more than a predetermined number of) long words and fewer than a fraction of an expected number of words in the text line. Long words (as measured by the number of characters in the words) may be defined as, for example, words that are longer than a predetermined multiple (e.g. 2, 2.5, 3) of the average word length. The average word length is language specific; the average word length is approximately five characters for typical English language text. More specifically, each candidate word segments obtained in step S13 is examined to determine the number of candidate character spacing segments within that word, and the word length is the number of candidate character spacing segments plus 1. Alternatively, connected components (i.e. connected groups of black pixels in the document image) may be extracted from the candidate word to determine the number of characters based on the assumption that each connected component is a character (excluding small connected components corresponding to dots).

An expected number of words for the text line can be estimated as the number of characters in the line divided by the average word length. The number of characters in the line is equal to the total number of spacing segments obtained in step S11 plus 1. The average word length is again approximately 5 characters. The number of candidate words in the text line is directly obtained from the initial segmentation step S12. If the number of candidate words in the line is less than a predetermined fraction (e.g. 0.5) of the expected number or words for the line, the line is deemed to have too few words.

Other conditions may also be used to evaluate the adequacy of the first round of word segmentation.

If any condition exist which indicates that the word segmentation is inadequate, e.g., if (1) the group of candidate character spacing segments still have a bimodal or multi-modal length distribution, or (2) the spread of the length distribution of the candidate character spacing segments is greater than a predetermined threshold, or (3) the line contains long words and too few words, then another round of word segmentation is performed to classify the candidate character spacing segments into two new groups based on their lengths (step S17). This round of word segmentation may use the same classification techniques as the initial word segmentation step S12 but operates on the candidate character spacing segments rather than all spacing segments. The new group of shorter spacing segments from step S17 are deemed current candidate character spacing segments, and all other spacing segments are deemed current candidate word spacing segments. The candidate word segments are extracted by repeating step S13 using the current candidate word spacing segments. Steps S14 to S16 are then repeated to determine whether the resulting word segmentation is adequate, and additional rounds of word segmentation may be performed accordingly.

After a round of word segmentation (step S12 or S17), if none of the conditions exists which indicates the inadequacy of the word segmentation ("No" in steps S14, S15 and S16), the segmentation is deemed adequate. Thus, the candidate word segments extracted from this round of segmentation (step S13) represent the final word segmentation result, and the process continues to the next line.

It should be noted that the step of repeating the word segmentation (step S17) is not the same as repeating word segmentation on an individual "word" segment produced by the previous word segmentation step. The latter method would only consider the spacing segments within a single previously produced "word" segment and classify those spacing segments into two groups. The repeating step S17 in this embodiment, on the other hand, is applied to all spacing segments in the line previously classified as character spacing segments, which will be a collection of all spacing segments present within all previously produced "word" segments of the line.

Figure 3:
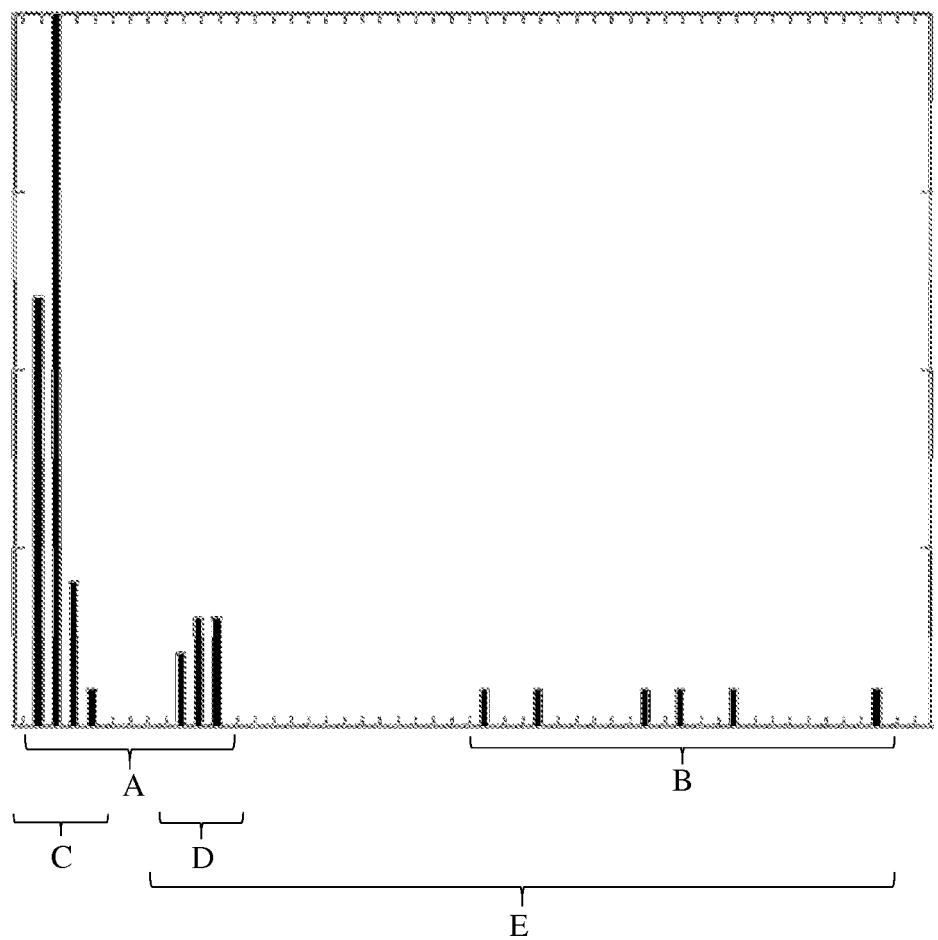
FIG. 3 illustrates a result of the recursive word segmentation method applied to the example of FIG. 1C.

The example shown in FIG. 1E is reproduced in FIG. 3 to show the result of the recursive segmentation method described above. The initial round of word segmentation results in all spacing segments being classified into two groups indicated by A (candidate character spacing segments) and B (candidate word spacing segments). In the second round of word segmentation, members of group A is further classified into groups C (new candidate character spacing segments) and D (new candidate word spacing segments). As can be seen in the figure, the distribution of the spacing segments in group C is no longer bimodal or multi-modal and the spread of their lengths is now below the threshold. As the result of two rounds of word segmentation, group C are the final character spacing segments and group E (groups B and D combined) are the final word spacing segments.

Figure 4:
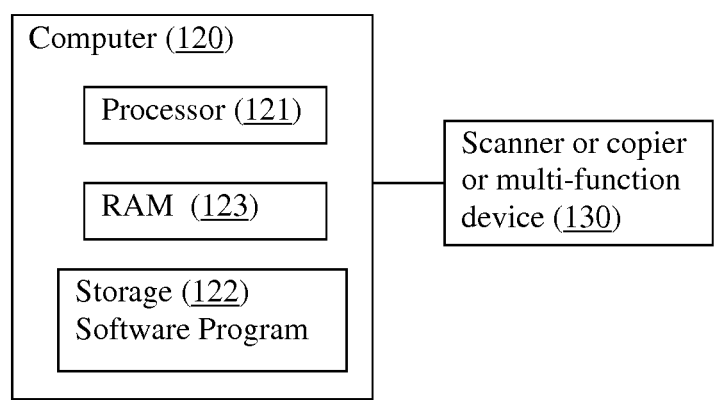
FIG. 4 schematically illustrates a data processing apparatus in which embodiments of the present invention may be implemented.

The word segmentation methods described here can be implemented in a data processing apparatus such as a computer 120 shown in FIG. 4. The computer 120 includes a processor 121, a storage device (e.g. hard disk drive) 122, and an internal memory (e.g. RAM) 123. The storage device 122 stores software programs, which are read out to the RAM 123 and executed by the processor 121 to carry out the methods described here. The computer 120 may be connected to a scanner, copier or multi-function device 130 which has a scanning section that can be used to scan a printed document to be processed by the computer 120. Alternatively, the processor 121, storage device 122 and RAM 123 may be located within the scanner/copier/multi-function device 130, in which case the scanner/copier/multi-function device can directly output processed document such as OCR'ed text. The term data processing apparatus may refer to either the computer 120 or the scanner/copier/multi-function device 130.

In one aspect, the invention is embodied in a data processing apparatus. In another aspect, the invention is computer program product embodied in computer usable non-transitory medium (e.g. storage 122) having a computer readable program code embedded therein for controlling a data processing apparatus. In another aspect, the invention is a method carried out by a data processing system.

It will be apparent to those skilled in the art that various modification and variations can be made in the word segmentation method and related apparatus of the present invention without departing from the spirit or scope of the invention. Thus, it is intended that the present invention cover modifications and variations that come within the scope of the appended claims and their equivalents.

What is claimed is:

1. A word segmentation method performed by a computer for segmenting a text line image into a plurality of word images, the text line image and each of the word images being a digital image, the method comprising:
   (a) obtaining a plurality of one-dimensional spacing segments from the text line image, the spacing segments corresponding to white spaces within the text line image, each of the spacing segments having a length;
   (b) classifying the plurality of spacing segments based on their lengths into a first group and a second group, each spacing segment belonging to the first group being shorter than each spacing segment belonging to the second group;
   (c) further classifying the spacing segments of the first group based on their lengths into a new first group and a new second group, each spacing segment belonging to the new first group being shorter than each spacing segment belonging to the new second group; and
   (d) segmenting the text line image into a plurality of word segments, each word segment being defined by two spacing segments not belonging to the new first group of spacing segments to generate the plurality of word images each containing a word.

2. The method of claim 1, further comprising, after step (b), determining whether the lengths of the spacing segments belonging to the first group have a bimodal or multi-modal distribution, wherein step (c) is performed if the lengths of the spacing segments belonging to the first group have a bimodal or multi-modal distribution.

3. The method of claim 1, further comprising, after step (b), determining whether a spread of length distribution of the spacing segments belonging to the first group is greater than a predetermined threshold, the spread being defined as a length difference between a longest one and a most frequent one of the spacing segments belonging to the first group, wherein step (c) is performed if the spread is greater than the predetermined threshold.

4. The method of claim 1, further comprising:
   based on the classification of step (b), calculating a number of characters in the text line, a number of words in the text line wherein each word is defined by two spacing segments belonging to the second group, a word length for each word in the text line, and an expected number of words for the text line which is the number of characters in the text line divided by a predetermined average word length,
   wherein step (c) is performed if the word lengths of a predetermined number of words in the text line exceed the predetermined average word length and the number of words in the text line is less than a predetermined fraction of the expected number of words for the text line.

5. A word segmentation method performed by a computer for segmenting a text line image into a plurality of word images, the text line image and each of the word images being a digital image, the method comprising:
   (a) obtaining a plurality of one-dimensional spacing segments from the text line image, the spacing segments corresponding to white spaces within the text line image, each of the spacing segments having a length;
   (b) classifying the plurality of spacing segments based on their lengths into a first group and a second group, each spacing segment belonging to the first group being shorter than each spacing segment belonging to the second group;
   (c) based on the first and second groups of spacing segments obtained in step (b), determining whether any of a plurality of predetermined conditions exists;
   (d) if any one of the predetermined conditions is determined to exist in step (c), further classifying the spacing segments of the first group based on their lengths into a new first group and a new second group, each spacing segment belonging to the new first group being shorter than each spacing segment belonging to the new second group; and
   (e) segmenting the text line image into a plurality of word segments, each word segment being defined by two spacing segments not belonging to the new first group of spacing segments to generate the plurality of word images each containing a word.

6. The method of claim 5, wherein the plurality of predetermined conditions in step (c) include:
   (1) the lengths of the spacing segments belonging to the first group have a bimodal or multi-modal distribution,
   (2) a spread of length distribution of the spacing segments belonging to the first group is greater than a predetermined threshold, the spread being define as a length difference between a longest one and a most frequent one of the spacing segments belonging to the first group, and
   (3) word lengths of a predetermined number of words in the test line exceed a predetermined average word length and a number of words in the text line is less than a predetermined fraction of an expected number of words for the text line, wherein the words in the text line are defined by spacing segments belonging to the second group.

7. The method of claim 5, further comprising, after step (d) and before step (e):

(f) based on new first group and new second group of spacing segments obtained in step (d) and the second group of spacing segments obtained in step (b), determining whether any of the plurality of predetermined conditions exists, wherein step (e) is performed if none of the predetermined conditions is determined to exist in step (f).

8. A computer program product comprising a computer usable non-transitory medium having a computer readable program code embedded therein for controlling a data processing apparatus, the computer readable program code configured to cause the data processing apparatus to execute a word segmentation process for segmenting a text line image into a plurality of word images, the process comprising:

(a) obtaining a plurality of one-dimensional spacing segments from the text line image, the spacing segments corresponding to white spaces within the text line image, each of the spacing segments having a length;

(b) classifying the plurality of spacing segments based on their lengths into a first group and a second group, each spacing segment belonging to the first group being shorter than each spacing segment belonging to the second group;

(c) based on the first and second groups of spacing segments obtained in step (b), determining whether any of a plurality of predetermined conditions exists;

(d) if any one of the predetermined conditions is determined to exist in step (c), further classifying the spacing segments of the first group based on their lengths into a new first group and a new second group, each spacing segment belonging to the new first group being shorter than each spacing segment belonging to the new second group; and (e) segmenting the text line image into a plurality of word segments, each word segment being defined by two spacing segments not belonging to the new first group of spacing segments.

9. The computer program product of claim 8, wherein the plurality of predetermined conditions in step (c) include:

(1) the lengths of the spacing segments belonging to the first group have a bimodal or multi-modal distribution, (2) a spread of length distribution of the spacing segments belonging to the first group is greater than a predetermined threshold, the spread being define as a length difference between a longest one and a most frequent one of the spacing segments belonging to the first group, and (3) word lengths of a predetermined number of words in the test line exceed a predetermined average word length and a number of words in the text line is less than a predetermined fraction of an expected number of words for the text line, wherein the words in the text line are defined by spacing segments belonging to the second group.

10. The computer program product of claim 8, wherein the process further comprises, after step (d) and before step (e):

(f) based on new first group and new second group of spacing segments obtained in step (d) and the second group of spacing segments obtained in step (b), determining whether any of the plurality of predetermined conditions exists, wherein step (e) is performed if none of the predetermined conditions is determined to exist in step (f).

11. A computer program product comprising a computer usable non-transitory medium having a computer readable program code embedded therein for controlling a data processing apparatus, the computer readable program code configured to cause the data processing apparatus to execute a word segmentation process for segmenting a text line image into a plurality of word images, the process comprising:

(a) obtaining a plurality of one-dimensional spacing segments from the text line image, the spacing segments corresponding to white spaces within the text line image, each of the spacing segments having a length;

(b) classifying the plurality of spacing segments based on their lengths into a first group and a second group, each spacing segment belonging to the first group being shorter than each spacing segment belonging to the second group;

(c) further classifying the spacing segments of the first group based on their lengths into a new first group and a new second group, each spacing segment belonging to the new first group being shorter than each spacing segment belonging to the new second group; and (d) segmenting the text line image into a plurality of word segments, each word segment being defined by two spacing segments not belonging to the new first group of spacing segments.

12. The computer program product of claim 11, wherein the process further comprises, after step (b), determining whether the lengths of the spacing segments belonging to the first group have a bimodal or multi-modal distribution, wherein step (c) is performed if the lengths of the spacing segments belonging to the first group have a bimodal or multi-modal distribution.

13. The computer program product of claim 1, wherein the process further comprises, after step (b), determining whether a spread of length distribution of the spacing segments belonging to the first group is greater than a predetermined threshold, the spread being defined as a length difference between a longest one and a most frequent one of the spacing segments belonging to the first group, wherein step (c) is performed if the spread is greater than the predetermined threshold.

14. The computer program product of claim 1, wherein the process further comprises:

based on the classification of step (b), calculating a number of characters in the text line, a number of words in the text line wherein each word is defined by two spacing segments belonging to the second group, a word length for each word in the text line, and an expected number of words for the text line which is the number of characters in the text line divided by a predetermined average word length, wherein step (c) is performed if the word lengths of a predetermined number of words in the text line exceed the predetermined average word length and the number of words in the text line is less than a predetermined fraction of the expected number of words for the text line.

* * * * *